United States Patent [19]
Hayashi

[11] Patent Number: 4,964,707
[45] Date of Patent: Oct. 23, 1990

[54] DIFFERENTIAL INTERFERENCE MICROSCOPE

[75] Inventor: Shinichi Hayashi, Hachiouji, Japan

[73] Assignee: Olympus Optical Co., Ltd., Tokyo, Japan

[21] Appl. No.: 446,315

[22] Filed: Dec. 5, 1989

[30] Foreign Application Priority Data

Dec. 5, 1988 [JP] Japan ............................ 63-307272

[51] Int. Cl.$^5$ ...................... G02B 27/28; G02B 21/14; G02B 5/30; G02B 1/08
[52] U.S. Cl. .................................. 350/510; 350/401; 350/402; 350/404
[58] Field of Search ......................... 350/510, 401-404

[56] References Cited

U.S. PATENT DOCUMENTS

| | | | |
|---|---|---|---|
| 3,614,195 | 10/1971 | Voller | 350/510 |
| 3,868,168 | 2/1975 | deVeer | 350/510 |
| 3,904,267 | 9/1975 | deVeer | 350/510 |

Primary Examiner—Jon W. Henry
Attorney, Agent, or Firm—Cushman, Darby & Cushman

[57] ABSTRACT

The differential interference microscope comprises a beam splitter and a compensator, either one being made of a positive birefringent substance and the other being made of a negative birefringent substance, which are arranged in such a manner that the optic axes of both the prisms are located substantially on the same plane, or a polarizing optical element composed by combining a wedge-shaped prism made of a positive birefringent substance with another wedge-shaped prism made of a negative birefringent substance in such a manner that the optic axes of both the prisms are located substantially on the same plane. The differential interference microscope is capable of providing a uniform visual field without enhancing manufacturing cost therefor nor enlarging the space to be occupied thereby.

12 Claims, 2 Drawing Sheets

DIFFERENTIAL INTERFERENCE MICROSCOPE

BACKGROUND OF THE INVENTION (a) Field of the Invention

The present invention relates to a differential interference microscope so adapted as to observe a light ray from an object through a compensator and an analyzer while irradiating the object with a light ray emitted from a light source through a polarizer and a beam splitter, and to polarizing optical elements such as a beam splitter and compensator to be used in the differential interference microscope.

(b) Description of the Prior Art

The conventional transmission type differential interference microscope consists, as illustrated in FIG. 1, of a light source 1, a polarizer 2 for linearly polarizing the light ray emitted from the light source 1, a first Wollaston prism 3 (beam splitter) for delicately splitting said linearly polarized light ray into the ordinary light ray and the extraordinary light ray, a condenser lens 4 for making said ordinary light ray and the extraordinary light ray parallel to each other for irradiation of an object M, an objective lens 5 for converging the ordinary light ray and the extraordinary light ray having been transmitted through the object M, a second Wollaston prism 6 (compensator) for composing the ordinary light ray and the extraordinary light ray, an analyzer 7 for obtaining an image consisting of the composed light rays, i.e., a differential interference image by allowing interference between the two polarized light components which have passed through portions of the object M slightly deviated from each other and have been composed by the second Wollaston prism 6, and an eyepiece lens 8 for observing this image.

However, the conventional differential interference microscope described above has a defect that, as shown in FIG. 2 the visual field thereof is not darkened completely but a black striped cross image is formed within the visual field even when no object is placed on the sample stage, thereby degrading uniformity of the visual field. This black striped image is formed for the reason described below. The Wollaston prisms 3 and 6 are ordinarily made of a birefringent uniaxial crystal such as quartz. In case of a plane parallel plate made of quartz cut out in the direction parallel to the optic axis thereof as illustrated in FIG. 3, the ordinary light ray and the extraordinary light ray travel at different velocities in quartz, thereby differentiating optical path length. When the difference in optical path length is represented by R, it is approximated as follows:

$$R = \left(1 - \tfrac{1}{2} \frac{i^2}{n^2} \cos 2\theta \right)(n_e - n_o)d \quad (1)$$

wherein the reference symbol $i$ represents angle formed between the light ray incident on the plane parallel plate and the optical axis, the reference symbol $\theta$ designates azimuth between the incident light ray and the optic axis, the reference symbols $n_e$ and $n_o$ denote refractive indices of the substance composing the plane parallel plate for the ordinary light ray and the extraordinary light ray respectively, the reference symbol n represents mean value of the refractive indices for both the light rays $(n=(n_e+n_o)/2)$, and the reference symbol d designates thickness of the plane parallel plate as measured on the optical axis. In order to cancel the difference in optical path length R, each of the Wollaston prisms 3 and 6 is designed as a combination of two wedge-shaped prisms arranged in such a manner that the optic axes thereof are perpendicular to each other. When the two prisms are combined in this manner, the ordinary light ray and the extraordinary light ray for one wedge-shaped prism are the extraordinary light and the extraordinary light for the other wedge-shaped prism, respectively, whereby the difference in optical path length produced in one wedge-shaped prism is cancelled by the other wedge-shaped prism. However, this design is effective for cancelling only the term of $(n_e - n_o)d$ in the formula (1) mentioned above. Due to cos $2(\theta+90°)=\cos(2\theta+180°)=-\cos 2\theta$, the term including $i^2 \cos 2\theta$ is arithmetically composed and remains without being cancelled, thereby producing ununiformity of the difference in optical path length, i.e., the striped cross image and ununiformalizing the visual field.

Solution of this problem was attempted by U.S. Pat. No. 3,904,267. However, the differential interference microscope disclosed by this patent comprises an additional compensator made of a birefringent substance for cancelling the term including $i^2 \cos 2\theta$, i.e., the ununiformity of the difference in optical path length and requires an increased number of optical elements, thereby posing another problem that the microscope occupies a wider space and requires higher manufacturing cost.

SUMMARY OF THE INVENTION

In view of the problems described above, it is a primary object of the present invention to provide a differential interference microscope which is capable of uniformalizing the visual field thereof without enlarging the space to be occupied by the microscope nor enhancing manufacturing cost therefor, and polarizing optical elements to be used therein.

In the differential interference microscope according to the present invention, either one of the beam splitter and the compensator is made of a positive birefringent substance, whereas the other of the beam splitter and the compensator is made of a negative birefringent substance, and these members are arranged in such a manner that the optic axes thereof are located substantially on the same plane.

Further, the polarizing optical element according to the present invention is composed by combining a wedge shaped prism made of the positive birefringent substance and a wedge-shaped prism made of the negative birefringent substance in such a manner that the optic axes thereof are located substantially on the same plane.

The differential interference microscope according to the present invention wherein the positive birefringent substance $(n_e > n_o)$ is combined with the negative birefringent substance $(n_e < n_o)$ so as to locate the optic axes thereof on the same plane, sets the same azimuth for both the birefringent substances and cancels the terms including $i^2 \cos 2\theta$ with each other. Moreover, the differential interference microscope according to the present invention does not require an increased number of optical elements nor a structure more complicated than that of the conventional differential interference microscope.

This and other objects as well as the features and the advantages of the present invention will become apparent from the following detailed description of the preferred embodiments when taken in conjunction with the accompanying drawings.

DESCRIPTION OF THE PREFERRED EMBODIMENTS

Figure 1:
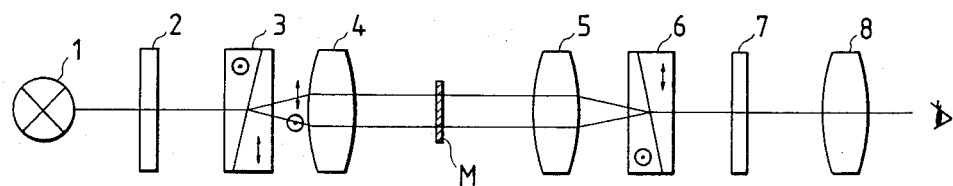
FIG. 1 is a sectional view illustrating the optical system of the conventional differential interference microscope.
Figure 2:
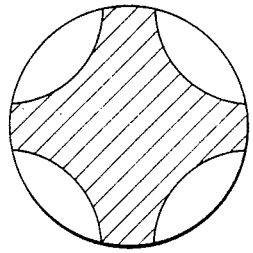
FIG. 2 is a sketch illustrating the ununiformity in the visual field of the optical system of the conventional example.
Figure 3:
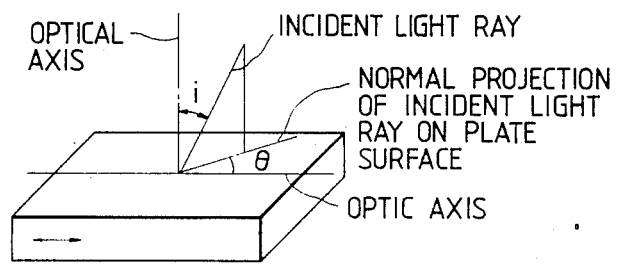
FIG. 3 is a perspective view illustrating a plane parallel plate made of quartz cut out in the direction parallel to the optic axis thereof.

Now, the present invention will be detailedly described below with reference to the preferred embodiments illustrated in the accompanying drawings wherein the same members as those of the conventional example will be represented by the same reference numerals.

Figure 4:
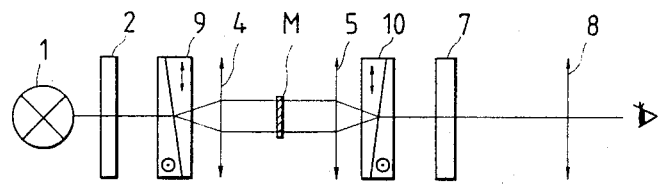
FIG. 4 is a sectional view illustrating an optical system of Embodiment 1 of the differential interference microscope according to the present invention.
Figure 5:
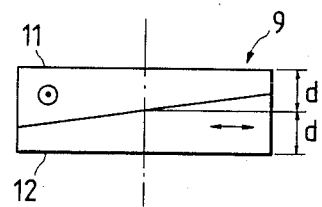
FIG. 5 is a sectional view illustrating the Wollaston prism to be used in the Embodiment 1 of the present invention.

FIG. 4 illustrates, as the Embodiment 1 of the present invention, an optical system of a transmission type differential interference microscope wherein a Wollaston prism 9 made of a positive birefringent substance, for example quartz, is used as the beam splitter and a Wollaston prism 10 made of a negative birefringent substance, for example sapphire, is used as the compensator, both the Wollaston prisms being ordinarily arranged so as to locate the optic axes thereof substantially on the same plane. The Wollaston prism 9 is composed, as illustrated in FIG. 5, by combining two wedge-shaped prisms 11 and 12 which have optic axes perpendicular to the optical axis of the optical system and intersecting at right angles with each other, the same thickness and the same vertical angle. Further, the Wollaston prism 10 has a structure fundamentally the same as that of the Wollaston prism 9. Furthermore, the first Wollaston prism 9 is used with a specific objective lens 5, whereas the second Wollaston prism 10 is employed commonly to a plural number of objective lenses 5.

When the two wedge-shaped prisms composing each of the Wollaston prisms 9 and 10 have the same thickness on the optical axis in the composition described above, the difference in optical path length R produced by the light rays passing through these two Wollaston prisms is expressed as follows:

$$R = \left\{ \left(1 - \frac{1}{2}\frac{i^2}{n^2}\cos 2\theta\right)(n_e - n_o)d - \left(1 + \frac{1}{2}\frac{i^2}{n^2}\cos 2\theta\right)(n_e - n_o)d \right\} - \left\{ \left(1 - \frac{1}{2}\frac{i^2}{n'^2}\cos 2\theta\right)(n_o' - n_e')d' - \left(1 + \frac{1}{2}\frac{i^2}{n'^2}\cos 2\theta\right)(n_o' - n_e')d' \right\}$$

$$= -\left\{ \frac{1}{n^2}(n_e - n_o)d - \frac{1}{n'^2}(n_o' - n_e')d' \right\} i^2 \cos 2\theta \quad (2)$$

wherein the reference symbol i represents angle formed between the incident light ray and the optical axis, the reference symbol $\theta$ designates azimuth between the incident light ray and the optical axis, the reference symbol $n_e$ and $n_o$ denote refractive indices of each of the wedge-shaped prisms 11 and 12 of the Wollaston prism 9 for the ordinary light ray and the extraordinary light ray respectively, the reference symbol n represents a mean value of the refractive indices of each wedge-shaped prism, the reference symbol d designates thickness of each wedge-shaped prism of the Wollaston prism 9, the reference symbols $n_e'$ and $n_o'$ denote refractive indices of each wedge-shaped prism of the Wollaston prism 10 for the ordinary light ray and the extraordinary light ray respectively, the reference symbol n' represents a mean value of the refractive indices of each wedge-shaped prism of the Wollaston prism 10, and the reference symbol d' designates thickness of each wedge-shaped prism of the Wollaston prism 10 as measured on the optical axis, $n_e$ and $n_o$ being 1.533 and 1.544 respectively when both the wedge-shaped prisms 11 and 12 of the Wollaston prism 9 are made of quartz, or $n_e'$ and $n_o'$ being 1.760 and 1.768 respectively when both the wedge-shaped prisms of the Wollaston prism 10 are made of sapphire.

Hence, it is possible to cancel the term dependent on the azimuth, i.e., the ununiformity of the difference in optical path length so as to obtain a uniform visual field free from the striped cross image by selecting a ratio between thickness d and thickness d' so as to establish the following relationship:

$$\frac{1}{n^2}(n_e - n_o)d = \frac{1}{n'^2}(n_o' - n_e')d' \quad (3)$$

Needless to say, the difference in optical path length is zeroed in this case. Furthermore, the Embodiment 1 does not enlarge the space to be occupied by the differential interference microscope nor enhances manufacturing cost therefor since it does not increase the number of the optical elements. Moreover, the Embodiment 1 provides a further advantage in manufacturing cost since the second Wollaston prism 10 made of sapphire, which is more expensive than quartz, is used commonly to the objective lenses. When the Wollaston prisms 9 are exchanged in conjunction with the objective lenses in the Embodiment 1, however, it cannot satisfy the formula (3) completely and may allow the ununiformity of the difference in optical path length to be produced at a slight degree. When it is necessary to cancel such a slight degree of ununiformity, it can be practiced to prepare a plural number of the Wollaston prisms 10 (compensators) different in the thickness thereof and selectively use the Wollaston prisms 10 for optimum cancellation of the ununiformity of the difference in optical path length produced by the Wollaston prism 9 (beam splitter). Though the wedge-shaped prisms of the Wollaston prisms 9 and 10 have the same thickness in the Embodiment 1 described above, it is possible to cancel the difference in optical path length and the ununiformity of difference in optical path length by using wedge-shaped prisms different in thickness thereof. Further, such a design makes it possible to cancel only the ununiformity of the difference in optical path length while reserving the difference in optical path length for the two polarized components. In addition, it is possible to use a Nomarski prism made of a positive birefringent substance as the beam splitter and a Nomarski prism made of a negative birefringent substance as the compensator.

Figure 6:
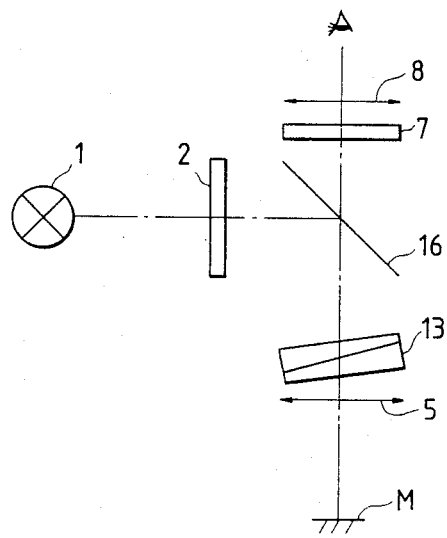
FIG. 6 is a sectional view illustrating an optical system of Embodiment 2 of the present invention.
Figure 7:
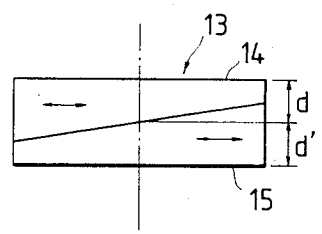
FIG. 7 is a sectional view illustrating the Wollaston prism to be used in the Embodiment 2 of the present invention.

FIG. 6 illustrates an optical system of a vertical illumination type differential interference microscope as the Embodiment 2 of the present invention. In case of the vertical illumination type microscope, the light ray emitted from the light source 1 is reflected by a half mirror 16 arranged on the optical axis of the objective lens 5, allowed to pass through a Wollaston prism 13 and projected to the object M through the objective lens 5, and the light reflected by the object M is condensed by the objective lens 5 and transmitted through the Wollaston prism 13 so as to form an image of the object M. In the Embodiment 2, the Wollaston prism 13 is used common as the beam splitter and as the compensator. The Wollaston prism 13 is composed, as illustrated in FIG. 7, of a wedge-shaped prism 14 made of a positive birefringent substance, for example quartz, and another wedge-shaped prism 15 made of a negative birefringent substance, for example sapphire, which are cemented to each other, and have optic axes perpendicular to the optical axis and parallel to each other, and the same vertical angle.

Since the Embodiment 2 has the composition described above, the difference in optical path length R produced by the polarized light components passing through the Wollaston prism 13 is expressed as follows:

$$R = \left(1 - \frac{1}{2}\frac{i^2}{n^2}\cos 2\theta\right)(n_e - n_o)d -$$

$$\left(1 - \frac{1}{2}\frac{i^2}{n'^2}\cos 2\theta\right)(n_o' - n_e')d'$$

$$= \{(n_e - n_o)d - (n_o' - n_e')d'\} -$$

$$\frac{1}{2}\left(\frac{1}{n^2}(n_e - n_o)d - \frac{1}{n'^2}(n_o' - n_e')d'\right)i^2\cos 2\theta$$

wherein the reference symbol i represents angle formed between the incident light ray and the optical axis, the reference symbol $\theta$ designates azimuth between the incident light ray and the optic axis, the reference symbols $n_e$ and $n_o$ denote refractive indices of the wedge-shaped prism 14 for the ordinary light ray and the extraordinary light ray respectively, the reference symbol n represents a means value of the refractive indices for both the light rays, the reference symbol d designates thickness of the wedge-shaped prism 14 as measured on the optical axis, the reference symbols $n_e'$ and $n_o'$ denote refractive indices of the wedge-shaped prism 15 for the ordinary light ray and the extraordinary light ray respectively, the reference symbol n' represents means value of the refractive indices for both the light rays, and the reference symbol d' designates thickness of the wedge-shaped prism 15 as measured on the optical axis. In the formula (4) mentioned above, the first term represents the difference in optical path length as measured on the optical axis and the second term represents the ununiformity of the difference in optical path length. It is therefore possible to zero the difference in optical path length and obtain a uniform visual field by selecting ratios between d and d' so as to cancel the first term and the second term of the above-mentioned formula or satisfy the following formulae (5) and (6):

$$(n_e - n_o)d = (n_o' - n_e')d' \quad (5)$$

$$\frac{1}{n^2}(n_e - n_o)d = \frac{1}{n'^2}(n_o' - n_e')d' \quad (6)$$

Figure 8:
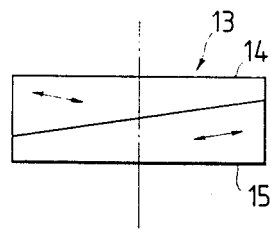
FIG. 8 is a sectional view illustrating a third example of the Wollaston prism.

However, the ratio between d and d' which zeroes the difference in optical path length on the optical axis is generally unequal to the ratio between d and d' which zeroes the ununiformity of difference in optical path length though these ratios can be determined uniquely respectively. When n and n' have values which are nearly equal to each other, however, the ununiformity of the difference in optical path length is nearly zeroed by zeroing the difference in optical path length on the optical axis as is seen from the above-mentioned formulae (5) and (6). Further, when values of $n_e - n_o$ and $n_o' - n_e'$ are nearly equal to each other in the above-mentioned formulae (5) and (6), values of d and d' are also nearly equal to each other, thereby making it possible to reduce thickness of the Wollaston prism as a whole. In addition, as shown in FIG. 8 the optic axes of wedge-shaped prisms 14 and 15 may be inclined from the direction perpendicular to the optical axis on the same plane in the Wollaston prism 13. Even when n has a value a little different from that of n', it is possible, by inclining the optic axes as described above, to change substantial values of $n_e$ and $n_e'$ so as to satisfy the formula (6) or cancel the second term of the above-mentioned formula (4) and obtain a uniform visual field accordingly while reserving an optional difference in optical path length. Furthermore, it is possible to optionally change the localized distance of a differential interference image by adequately inclining the optic axes of the wedge-shaped prisms 14 and 15 from the direction perpendicular to the optical axis on the same plane.

Moreover, the combination of the positive birefringent substance and the negative birefringent substance is not limited to the combination of quartz and sapphire, but may be selected adequately from among magnesium fluoride, ADP, KDP, calcite and so on.

The Embodiment 1 wherein the Wollaston prisms 9 and 10 have ununiformities of the difference in optical path length respectively is so adapted as to cancel the ununiformity of the difference in optical path length of the Wollaston prism 9 with the ununiformity of the difference in optical path length of the Wollaston prism 10. In the Embodiment 2, in contrast, the Wollaston prism 13 is so adapted as to cancel the ununiformity of the difference in optical path length by itself. In addition, it is possible, needless to say, to adopt an optical element which cancels the non-uniformity of the difference in optical path length by itself, like the Wollaston prism 13, in the Embodiment 1.

What is claimed is:

1. A differential interference microscope adapted to irradiate an object with the light emitted from a light source and transmitted through a polarizer and a beam splitter, and allow to observe the light from the object and transmitted through a compensator and an analyzer, wherein either one of said beam splitter and compensator is made of a positive birefringent substance and the other is made of a negative birefringent substance, and the optic axes of said beam splitter and said compensator are located substantially on the same plane.

2. A differential interference microscope according to claim 1 wherein each of said beam splitter and said compensator is a Wollaston prism.

3. A differential interference microscope according to claim 1, wherein each of said beam splitter and said compensator is a Nomarski prism.

4. A differential interference microscope according to claim 2 or 3 wherein one of quartz and magnesium fluoride is used as the positive birefringent substance and any one of sapphire, ADP, KDP and calcite is used as the negative birefringent substance.

5. A differential interference microscope according to claim 2 wherein said wollaston prism is composed by cementing two wedge-shaped prisms having optic axes perpendicular to the optical axis and intersecting at right angles with each other, and having the same vertical angle.

6. A differential interference microscope according to claim 5 wherein said two cemented wedge-shaped prisms are made of the same substance and have the same thickness as measured on the optical axis.

7. A differential interference microscope according to claim 1 or 2 wherein said beam splitter is exchangeably arranged and said compensator is fixedly arranged.

8. A polarizing optical element composed by combining a wedge-shaped prism made of a positive birefringent substance with another wedge-shaped prism made of a negative birefringent substance in such a manner that the optic axes of both the prisms are located substantially on the same plane, one of quartz and magnesium fluoride being used as the positive birefringent substance, and any one of sapphire, ADP, KDP and calcite is used as the negative birefringent substance.

9. A differential interference microscope adapted to irradiate an object with the light emitted from a light source and transmitted through a polarizer and a beam splitter, and allow to observe the light ray from the object and transmitted through a compensator and an analyzer, wherein each of said beam splitter and compensator is composed by combining a wedge-shaped prism made of a positive birefringent substance with another wedge-shaped prism made of a negative birefringent substance in such a manner that the optic axes of both the prisms are located on the same plane.

10. A differential interference microscope according to claim 9 wherein said beam splitter and said compensator are identical.

11. A differential interference microscope according to claim 9, wherein each of said beam splitter and said compensator is one of a Wollaston prism and a Nomarski prism.

12. A differential interference microscope according to claim 9 or 10, wherein one of quartz and magnesium fluoride is used as the positive birefringent substance and any one of a sapphire, ADP, KDP and calcite is used as the negative birefringent substance.

* * * * *